United States Patent [19]

Hübner et al.

[11] Patent Number: 4,578,099
[45] Date of Patent: Mar. 25, 1986

[54] APPLYING A LIQUID TO A GLASSWARE-MAKING PREFORM MOLD

[75] Inventors: Jochen Hübner, Bottrop-Welheim; Werner-Dieter Knoth; Helmut Hüllen, both of Essen, all of Fed. Rep. of Germany

[73] Assignee: Veba-Glas AG, Essen, Fed. Rep. of Germany

[21] Appl. No.: 600,188

[22] Filed: Apr. 13, 1984

[30] Foreign Application Priority Data

Apr. 16, 1983 [DE] Fed. Rep. of Germany ....... 3313851

[51] Int. Cl.$^4$ .............................................. C03B 40/02
[52] U.S. Cl. .......................................... 65/26; 65/24; 65/169; 65/235
[58] Field of Search ...................... 65/24, 26, 169, 235

[56] References Cited

U.S. PATENT DOCUMENTS 3,519,408  7/1970  Russell ..................................... 65/24
3,580,711  5/1971  Hamilton ............................. 65/26 X
3,672,860  6/1972  Keller ................................... 65/26 X Primary Examiner—Arthur Kellogg
Attorney, Agent, or Firm—Karl F. Ross; Herbert Dubno

[57] ABSTRACT

Hollow glassware is made in a method wherein a necking shear is displaceable between one end position blocking one end of a passage of a preform mold and another end position at a final mold and a liquid is sprayed into the other end of the passage of the preform mold. In addition the necking shear is temporarily retained in an intermediate position between the two molds and simultaneously the liquid is sprayed into the passage. This passage is upright and the one end is below the other end. Thus a pocket of air that would prevent the mist from settling in the passage is not created, and the passage can be effectively wetted even by a relatively small volume of liquid. A bottom-blowing unit constituted as a vertically displaceable plug is provided below the preform mold. This plug is raised once the gob is in place and during top blowing to form the initial hollow in it and is shielded during spraying of the liquid into the passage. This shielding can be effected by blowing air against the lower end of the passage, or a cover can be slid into place over the lowered plug.

6 Claims, 1 Drawing Figure

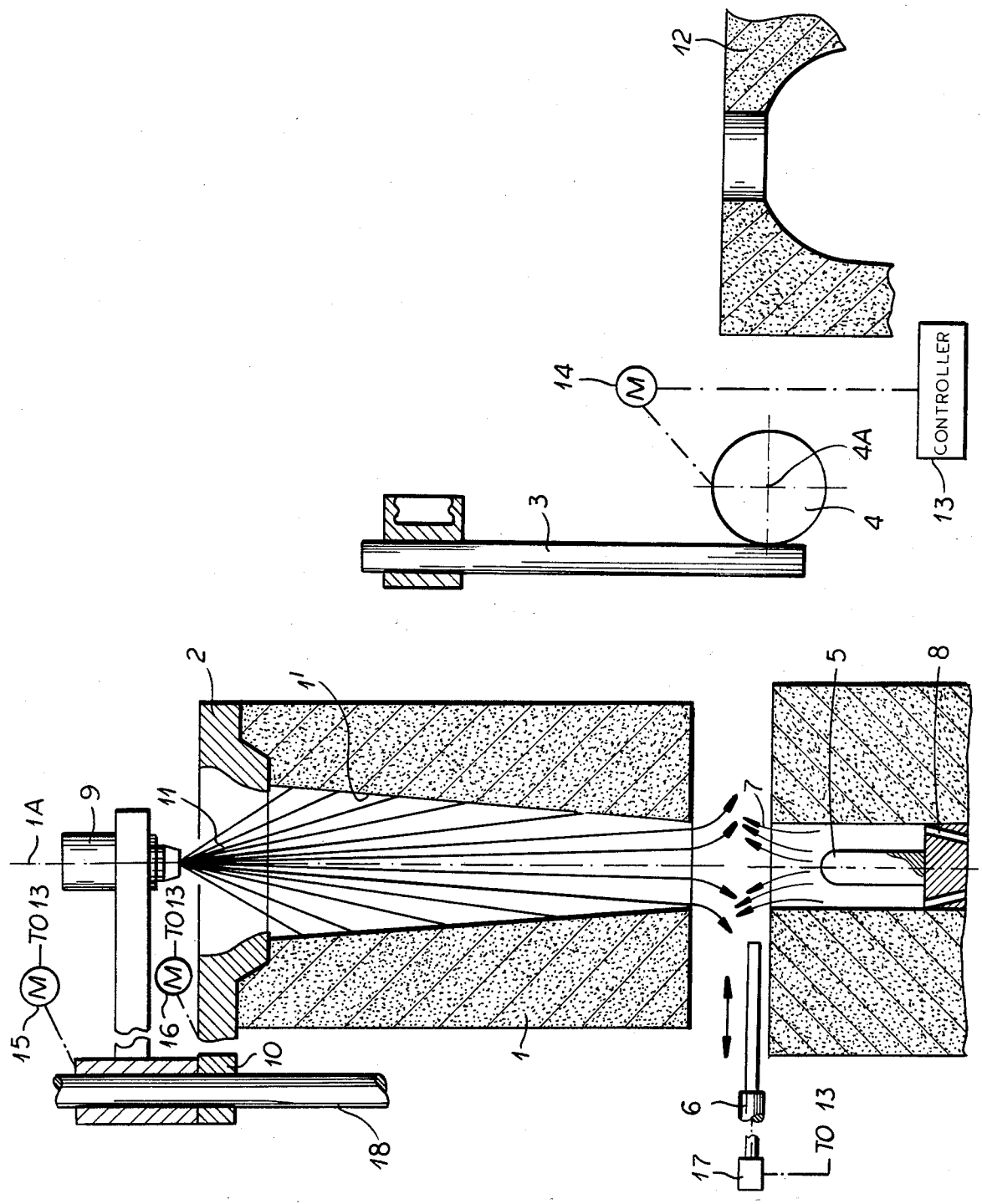

4,578,099

APPLYING A LIQUID TO A GLASSWARE-MAKING PREFORM MOLD

FIELD OF THE INVENTION

The present invention relates to applying a liquid, normally a lubricant or release agent, to a preform used for the manufacture of hollow glassware. More particularly this invention concerns IS and RIS glassware-making machines.

BACKGROUND OF THE INVENTION

A preform for an IS or RIS machine has a central throughgoing passage having an upper end provided with a drop ring and a lower end that can be closed by a necking shear. When thus closed a gob of molten glass is dropped into the top of the passage and is blown down therein. A gauging device or plug fits itself to the necking shear and then blows the gob up, imparting a hollow shape to it. The preform mold is then opened up and the necking shear pivots to deposit the partially formed bottle in an adjacent final mold where it is reheated and finish blown.

It is normally essential to coat the interior of the mold with a liquid which prevents the hot glass from sticking to the normally metallic mold and assures good heat transfer. Manual application of the liquid is very difficult and impossible in densely set up modern-day machines.

This it is known to provide several spray nozzles at the upper passage end for applying the lubricant and/or mold-release agent to it. This liquid must not, however, be sprayed on the faces of the mold segments that must fit together, as it eventually will clog them and prevent the mold from closing properly. Hence it is only sprayed into the passage when the preform mold is closed again.

In the standard style of operation the preform mold is closed as or after the necking shear moves into place below it, so that when the liquid is sprayed into the upper passage end, the lower passage end is blocked. As a result the liquid mist sits on a trapped pocket of air and does not settle effectively in the mold passage. In order to be assured of wetting all of the inner preform-mold surfaces, it is therefore standard to use a large volume of the liquid, a procedure that is messy and wasteful of a valuable material.

OBJECTS OF THE INVENTION

It is therefore an object of the present invention to provide an improved method of wetting the mold passage of a preform mold.

Another object is the provision of such a method of wetting the mold passage of a preform mold which overcomes the above-given disadvantages, that is which allows the preform-mold passage to be effectively coated without wasting the liquid.

A further object is the provision of an improved preform-molding apparatus.

SUMMARY OF THE INVENTION

Hollow glassware is made in a method wherein a necking shear is displaceable between one end position blocking one end of a passage of a preform mold and another end position at a final mold and a liquid is sprayed into the other end of the passage of the preform mold. In addition according to this invention the necking shear is temporarily retained in an intermediate position between the two molds and simultaneously the liquid is sprayed into the passage. Thus the sprayed liquid can pass freely through the passage since its one end is not blocked by the shear.

This passage according to the invention is upright and the one end is below the other end. Thus a pocket of air that would prevent the mist from settling in the passage is not created, and the passage can be effectively wetted even by a relatively small volume of liquid. Whether injected as an aerosol spray or airless, the saving on material is considerable.

Normally a bottom-blowing unit constituted as a vertically displaceable plug is provided below the preform mold. This plug is raised once the gob is in place and during top blowing to form the initial hollow in it. According to this invention this unit is shielded during spraying of the liquid into the passage. This shielding can be effected by blowing air against the lower end of the passage, or a cover can be slid into place over the lowered plug.

With the method of this invention the segments are fitted together so that the passage is laterally closed before spraying the liquid into the passage. This prevents the segment faces from being fouled by the liquid.

In other words, the instant invention is a method of making glassware using a multipart preform mold closable to form a mold passage, a final mold adjacent the preform mold, and a neck-forming mold displaceable between the preform and final molds. The method comprises the steps of first spraying a mold-release liquid through the one end into the passage of the closed preform mold while holding the neck-forming mold in an intermediate position spaced from the other passage end and between the preform and final molds and thereafter displacing the neck-forming mold from the intermediate position into a position covering the other passage end. A gob of molten glass is then introduced through the one end into the passage whose other end is closed by the neck-forming mold and this gob is blown into a preform. The preform mold is then opened and the neck-forming mold and the gob carried thereby are moved from the preform mold to the final mold to position the gob therein. Then the neck mold is released from the gob and the neck mold is moved into the intermediate position. All of these steps are then repeated but the preform mold is closed generally during at least one of steps of moving the mold and gob and releasing the gob.

DESCRIPTION OF THE DRAWING

The above and other features and advantages will become more readily apparent from the following, reference being made to the accompanying drawing whose sole FIGURE is a partly diagrammatic molding apparatus according to this invention.

SPECIFIC DESCRIPTION

As seen in the drawing a standard molding apparatus for hollow glassware has a multipart preform or preliminary mold 1 having a central throughgoing passage 1' centered on an axis 1A. This mold 1 can normally be split in half along a diametral plane, although it is possible for it to have three or more identical segmental pieces that make it up.

As is standard, a drip ring 2 carried on an arm 10 in turn supported on a guide rod 18 parallel to the axis 1A can be moved by a respective actuator or motor 16 into position over the top of the preform mold 1. The other or lower end of the preform mold 1 can be closed by a vertically displacealbe plug 5 formed with passages 8 for blowing up as indicated at 7, and an actuator 6 can move a closure or cover 6 across this mold end also.

A horizontal shaft 4 defining a horizontal axis 4A carries a necking shear or transfer arm 3. A motor or actuator 14 operated like the motor 16 from a controller 13 can pivot the outer end of this arm 2 between a position below and closing the bottom of the preform 1 and a position atop a final mold 12.

The standard operation of this machine is to generally simultaneously close the preform mold 1 so its passage 1' is radially closed, and move the necking shear 3 into position under it to close this passage 1' axially downward. The drip ring 2 is then moved into position atop the preform mold 1 by means of the motor 16 and the actuator 17 moves the cover 6 into place to close the bottom of the shear 3. At this time a lubricant is somehow applied to the inner surfaces of the passage 1'.

A gob of molten glass is then dropped into the downwardly closed passage 1' and a blowing attachment is fitted to the ring 2 to blow this gob down in the passage 1'. The plate 6 is then moved aside and a bottom-blowing plug 5 is raised to hollow out the gob for preliminary blowing.

The preform 1 is then opened up and the partially formed bottle is carried by the arm 3 through 180° about the axis and is inserted into the final mold 12 for reheating and finish blowing. This action moves the preformed bottle from a position projecting upward from the arm 3, which extends to the left as seen in FIG. 1, to a position with the arm 3 extending to the right and the preformed bottle extending down.

According to this invention a sprayer 9 is provide that can be moved about the rod 18 by means of another motor 15 operated by the controller 13. This sprayer 9 emits a spray 11 of a mold-release agent. This spraying is done according to this invention before the necking shear 3 has closed the bottom side of the passage 1', to which end the necking shear 3 is arrested on its return from the final mold in the position illustrated in the drawing. Thus the spray 11 will not sit atop a trapped pocket of air, but will be able to fall naturally through the passage 1', effectively coating it.

In this manner it is possible to thoroughly coat the passage 1' with a small quantity of liquid. Flooding the equipment and the joint between the preform-mold segments is largely avoided. Arresting the neck ring 3 midway between the finish mold 12 and the preform mold 1 can be done relatively easily, as the exact positioning is not important, so long as there is time to spray the passage 1'. As mentioned above, normally the transfer arm is returned to the preform before or while its segments are being automatically fitted together so that by the time the mold 1 is closed and can be sprayed without getting the spray between the mold segments, this element 3 closes the bottom of the mold 1.

We claim:

1. An apparatus for making hollow glassware, the apparatus comprising:
   a preform mold having an upright throughgoing passage with an upper end and a lower end;
   a bottom molding unit below the preform mold displaceable between an upper position engaged in the lower passage end and a lower position spaced below the preform mold;
   a final mold adjacent the preform mold;
   a neck-forming mold displaceable between one end position blocking the lower end of the passage and another end position at a final mold;
   means including nozzles displaceable into a position above the upper passage end for spraying a liquid into the upper end of the passage of the preform mold; and
   drive means for retaining the neck-forming mold temporarily in an intermediate position between the two molds and simultaneously spraying the liquid into the passage, whereby the sprayed liquid can pass freely through the passage since its one end is not blocked by the shear; and
   means for shielding the bottom molding unit below the one end of the passage and in the lower position of the unit during spraying of the liquid into the upper passage end.

2. The glassware-making apparatus defined in claim 1 wherein the shielding means includes passages for blowing air against the lower end of the passage.

3. The glassware-making apparatus defined in claim 1 wherein the shielding means includes a cover displaceable horizontally between the unit and the lower end of the passage.

4. A method of making glassware using a multipart preform mold closable to form an upright mold passage having upper and lower ends, a final mold adjacent the preform mold, and a neck-forming mold displaceable between the preform and final molds, the method comprising the steps of:
   (a) spraying a mold-release liquid through the upper end into the passage of the closed preform mold while holding the neck-forming mold in an intermediate position spaced from the lower passage end and between the preform and final molds and while shielding a bottom-blowing unit below the lower end of the passage;
   (b) thereafter displacing the neck-forming mold from the intermediate position into a position covering the lower passage end;
   (c) thereafter introducing a gob of molten glass through the upper end into the passage whose lower end is closed by the neck-forming mold;
   (d) thererafter blowing the gob into a preform;
   (e) thereafter opening the preform mold;
   (f) thereafter moving the neck-forming mold and the gob carried thereby from the preform mold to the final mold and positioning the gob therein;
   (g) thereafter releasing the neck mold from the gob and moving the neck mold into the intermediate position; and
   (i) thereafter repeating steps (a) through (g), the preform mold being closed generally during at least one of steps (f) and (g).

5. The glassware-making method defined in claim 4 wherein the mold has a plurality of segments, the method further comprising the steps of
   fitting the segments together so that the passage is laterally closed before spraying the liquid into the passage.

6. The glassware-making method defined in claim 4 wherein the bottom-blowing unit is shielded by blowing air against the lower end of the passage.

* * * * *